June 3, 1969

W. JUDA ET AL 3,447,288

GAS-DIFFUSION ASSEMBLY INCLUDING THIN
HYDROGEN-PERMEABLE IMPERVIOUS FOIL

Filed Aug. 23, 1965

WALTER JUDA
ROBERT LEE NOVACK, INVENTORS

BY Rines and Rines

ATTORNEYS

| United States Patent Office | 3,447,288 |
|---|---|
| | Patented June 3, 1969 |

3,447,288
GAS-DIFFUSION ASSEMBLY INCLUDING THIN HYDROGEN-PERMEABLE IMPERVIOUS FOIL
Walter Juda, Lexington, and Robert Lee Novack, Arlington, Mass., assignors to Prototeck Incorporated, Cambridge, Mass., a corporation of Massachusetts.
Filed Aug. 23, 1965, Ser. No. 481,748
Int. Cl. B01d *13/00*
U.S. Cl. 55—158        7 Claims

ABSTRACT OF THE DISCLOSURE

The invention relates to the providing of a novel gas-permeable impervious foil, as for such purposes as fuel cell electrodes and the like, the foil being thin enough to be non self-supporting, but rendered structurally useable by sintered connection to a relatively rigid openings-provided base support of a metal compatibly sinterable to the foil without closing off said openings.

---

Figure 1:
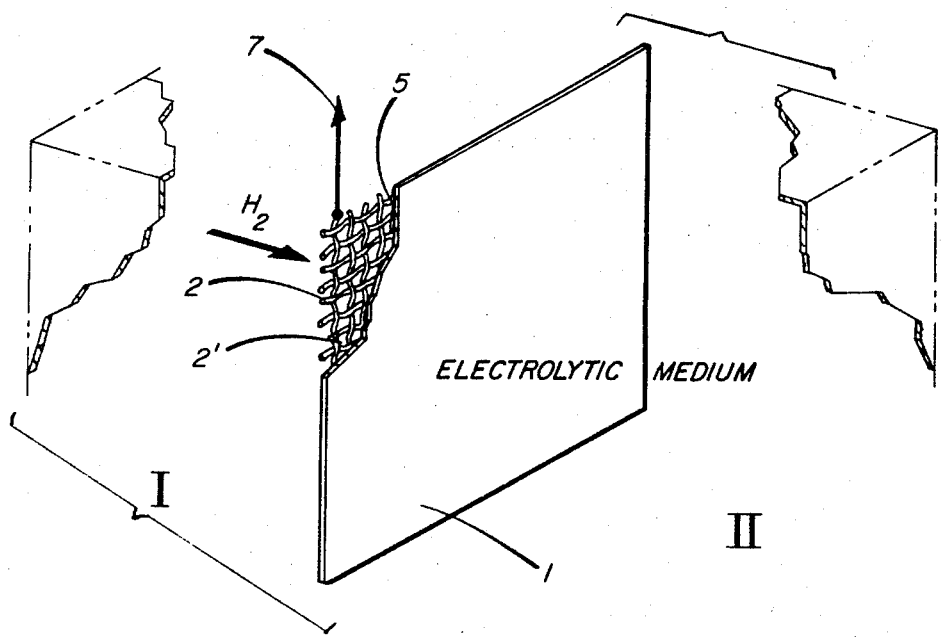

The present invention relates to thin gas-permeable otherwise impervious foils and the like and methods of preparing the same, being more particularly directed to hydrogen-permeable foils.

There are a number of commercial applications for gas-permeable, otherwise impervious layers, the economics of which require the employment of as thin a layer as possible. As an illustration, in fuel cell applications, hydrogen-permeable, otherwise impervious palladium-containing layers or foils are used as anode structures to enable the permeation of hydrogen gas through the layer while blocking all other gases or other products from passing through the layer. Suitable palladium-containing layers include, for example, pure palladium foils and siver-palladium alloys. Such layers are also used in the production of pure hydrogen from impure gaseous mixtures, and in other chemical and electrochemical processes, as well. When it is considered that palladium or palladium-containing layers and the like involve precious-metal raw material expenditures of the order of approximately $25 per square foot of a one-mil thick foil, it will be readily apparent that a reduction in thickness of the foil is a most desirable and, in some applications, essential economic factor. In the event, moreover, that other hydrogen-permeable, otherwise impervious metals (such as nickel, cobalt, iron, iron alloys and vanadium, to mention but a few of the more common) may be used for similar purposes, the matter of thinness of the foil becomes important for the different reason that the hydrogen diffusivity of such metals is considerably less than that of palladium-containing foil; and, thus, the thinner the foil can be made, the better its operation for the purposes herein discussed.

In copending application of Walter Juda, Ser. No. 154,724, filed Nov. 24, 1961, now U.S. Patent No. 3,206,332, for Electrolytic Cell Structure, there is disclosed a highly successful technique for supporting thin hydrogen-permeable foils involving a thin-walled multi-cell electronic insulator structure. There are, however, appications in which it is desired to provide electrical short-circuiting of closely spaced regions of a layer or foil in order to enable the withdrawal of current from the layer or foil as a whole with low internal resistance, as described in copending appication of the said Walter Juda et al., Ser. No. 308,417, filed Sept. 12, 1963. There are also significant reasons why in some applications it is desirable that the thin foil supporting structure be of metal.

Unfortunately, however, it has been found, particularly in the case of fuel cell structures and the like wherein high temperatures and corrosive electrolytic media are employed, that conventional welding and other techniques for producing a sizable foil structure from smaller dimensioned elements are not satisfactory; but, to the contrary, result in cracks and other defects in usage. It is, accordingly, to the principal problem of providing a new and improved method of forming extremely thin, selectively predetermined gas-permeable, otherwise impervious foil structures, together with the provision of an appropriate metallic supporting structure (consistent, also, with short-circuiting closely spaced regions over the surface of the foil, as before discussed), and thus to the manufacture of assemblies for use in gas-diffusion apparatus, that the present invention is primarily directed.

A further object is to provide a new and improved method of supporting an otherwise non-self-supporting, thin, hydrogen-permeable, otherwise impervious foil.

A further object is to provide such a method that is also adapted more generally to the support of thin otherwise non-self-supporting foils, layers, and the like.

Still a further object is to provide a novel thin, hydrogen-permeable, otherwise impervious metal layer structure.

Still an additional object is to provide a novel thin metal layer and support of more general utility, as well.

In summary, the method underlying the invention involves the sintering of a thin non-self-supporting foil or the like to an openings-provided base of metal compatibly sinterable to the metal of the foil within an inert or reducing medium. Preferred details of this process and preferred constructional embodiments are hereinafter set forth.

Figure 2:
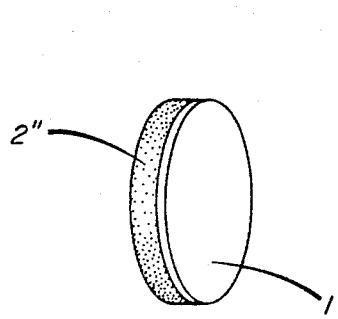
Figure 3:
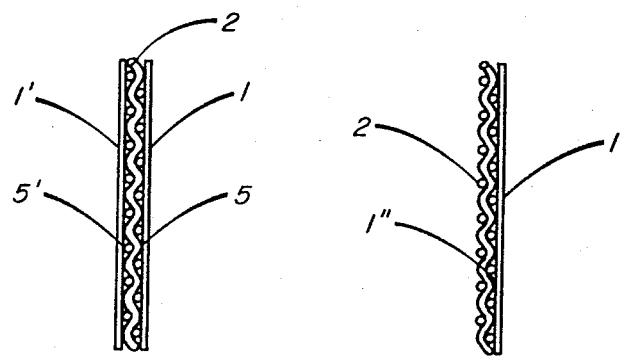
Figure 4:
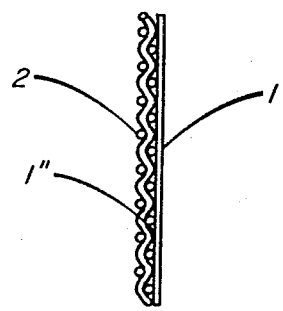
Figure 5:
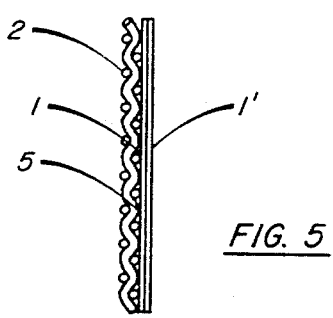

The invention will now be described with reference to the accompanying drawings, FIG. 1 of which is an isometric view of a substantially planar thin foil prepared in accordance with the method underlying the invention and supported in accordance with a preferred embodiment thereof;

FIG. 2 is a similar view of a modification embodying a porous sintered bed, support, or base; and FIGS. 3, 4 and 5 are fragmentary side elevational views of modifications of the structure of FIG. 1.

In accordance with the invention, a thin non-self-supporting, hydrogen-permeable, otherwise impervious foil 1, as of palladium, palladium-silver and the like, is supported by being sintered upon a base or support 2, illustrated in the form of a conductive wire gauze, screen, expanded metal or netting that has rigidity as compared with the flexibility of the thin foil 1 and, in some applications, is preferably thicker than the same. For such usages as fuel cells or the like, hydrogen may be fed through the openings 2' in the gauze, screen or netting, in the direction of the arrow at the region I of FIG. 1, and to the hydrogen-permeable foil 1 supported thereby.

To effect the sinter connection between the foil 1 and the base or support 2, the metal of the support 2 is selected to be compatibly sinterable to the foil 1, as explained, for example, in standard textbooks, such as "A Course in Powder Metallurgy," by W. J. Baeza, Reinhold Publishing Corp. (1943). In the case of the palladium-containing foil before-discussed, such a base metal may be selected, for example, from the group consisting of nickel, steel and steel alloys, brass, bronze, and silver. The foil 1 and gauze or other openings-provided base or support 2 are pressed together and then they are elevated in temperature to a degree sufficient to permit the sintering of the material of the base 2 to the adjacent closely spaced regions 5 of the foil 1 with which they are in contact. The sintering is carried out in an inert atmosphere, such as standard sintering atmospheres of $CO_2$, $N_2$, $H_2$, natural gas and the like, as described on page 85, for example, of the Baeza text. A hydrogen atmosphere is, however, preferred. The sintering is permitted to continue for a time sufficient to enable the sintered adherence of the wires of the base 2 to the adjacent regions 5 of the foil 1, but insufficient to cause the wires to deform and close off the openings 2' between them. The sintering, indeed, is carried out at a temperature well below the melting temperature of the metals involved—in this case of the order of 1000° C.

Upon cooling, the sintered product 1–2, electrically and mechanically joined at the regions 5 of sinter connection, provides a supported very thin hydrogen-permeable, otherwise impervious metal foil 1 adapted for use as an anode in fuel cells and other applications, such as those previously mentioned. The rigid base 2 preferably is somewhat thicker than the thin foil 1 and serves not only to provide the necessary mechanical support, but effectively to short-circuit the closely spaced regions 5 of the surface of the layer 1 to one another and thus to avoid appreciable contact resistance problems while providing a minimum internal resistance structure that is particularly adapted for large-area fuel cell electrodes and similar structures, as discussed in the said copending application of Walter Juda et al.

In the embodiment of FIG. 1, wherein the structure 1–2 is illustratively shown employed as a fuel cell anode with hydrogen applied at the region I, an electrolytic medium contacts the opposite or right-hand surface of the foil 1 at II. Conventional containers, cathodes, vents and other details of fuel cell construction are not illustrated since they form no part of the novelty herein, though it is to be understood that they are intended to be used, as is well known. External electrical connection to the electrode structure 1–2 may be provided at 7.

The type of openings-provided supporting structure is not restricted to wire gauze, screen or netting, but may assume a wide variety of forms including, as another illustration, the sintered nickel base 2″ of FIG. 2. Fuel cell anodes embodying $\frac{1}{10}$-mil thick silver-palladium foil 1, sintered to a sintered porous nickel bed 2‴, have been successfully fabricated by pressing the foil 1 to the base 2″ in a hydrogen furnace at a temperature of about 1000° C. for a period of about 25 minutes. This was found to provide excellent multiple-region electrical and mechanical contacts between the base 2″ and the very thin foil 1 and maintained substantial porosity or openings in the base 2″ to pass hydrogen therethrough. Similarly, fractional mil palladium foils have been successfully sintered to nickel wire gauze of wire diameter approximately 11 mils and opening area approximately 50 mesh, and such structures have also been satisfactorily operated as a fuel cell anode with an elevated temperature (420° C.) molten electrolytic medium II.

It often happens that in rolling very thin palladium-containing foils and the like, as of the order of fractional mils, unintentional holes or cracks occur which would, of course, impair the utility of these structures for such applications as fuel cells and the like. At least two techniques have been evolved for solving this problem and still permitting the utilization of such thin films. In fact, these two techniques can, if desired, be combined. In accordance with the first technique, as illustrated in FIG. 5, a second hydrogen-permeable, otherwise impervious thin film (which may or may not be of the same metal as the first) is applied at 1' to the outer surface of the foil 1 and is sintered in place at the same time as the sintering of the foil 1 to the base 2, forming a double-layer construction 1–1'. Alternatively, the second foil 1' may be sintered in a subsequent step. Since the probability of any random, unintentional holes in the foils 1 and 1' exactly lining up is very slight, the adherence of the two hydrogen-permeable foils 1 and 1' has been found greatly to reduce, if not eliminate, the problems of such unintentional holes in thin foils. The two foils 1 and 1', as above indicated, may be of the same metal, as of nickel, palladium and silver-palladium for the case of hydrogen-permeable layers; or, if it is desired to reduce expense and maintain the least corrosive layer in contact with the electrolytic medium II of a fuel cell, for example, the thin layer 1 may be of nickel, silver-palladium or the like, and the outer layer 1' of silver-palladium or pure palladium.

A second highly effective technique for overcoming the unintentional hole problem in very thin films is illustrated in FIG. 4 in connection with the structure of the embodiment of FIG. 1. The thin foil 1 is provided with a coating, preferably of the palladium or other metal thereof, which may be applied in a number of well-known ways. A preferred application of the coating involves the utilization of an organic suspension paste containing finely divided palladium (or a compound thereof) which is applied preferably at 1″ to the left-hand surface of the thin layer 1 of FIG. 4 over the wire support 2, and is then fired in air at a temperature sufficient to oxidize or decompose the organic component or compound (for example, at about 1,000° F.). This has been found, in practice, to result in a palladium-metal sealing of unintentional holes, with the metal of the thin layer 1. Though subjected to operational conditions over many hours, the sealed layer has been found to stand up in the same manner as a thicker completely original impervious foil.

Particularly in those cases where the very thin foil is to be subjected to other media than the gas to which it is permeable (as, for example, in the application of impure hydrogen thereto), in order to avoid flooding the surface of the thin layer with the undesired products, a second hydrogen-permeable layer 1' may be applied to the opposite surface of the screen base support 2, as shown in FIG. 3. This may be even more important in cases where a sintered porous base 2' is used, as in the embodiment of FIG. 2. The second hydrogen-permeable layer 1' may be either identical to the first layer 1, or just of the same metal, or it may be of a different hydrogen-permeable metal, as discussed in connection with the embodiment of FIG. 5.

While the invention has been herein described with particular reference to the important application to hydrogen-permeable, otherwise impervious layers, it will be readily understood that the techniques and structural details herein set forth are of decided utility in connection with other thin layers that are selectively permeable to other gases than hydrogen. As an example, silver layers may be used for the purification of oxygen streams, silver being selectively permeable to oxygen, though not nearly to the degree that palladium and the like are permeable to hydrogen. The present invention, indeed, provides, so far as we are aware, the first practical means for utilizing sufficiently thin silver layers in such applications to render them more generally commercially feasible.

Further modifications will occur to those skilled in the art and all such are considered to fall within the spirit and scope of the invention as defined in the appended claims.

What is claimed is:

1. Gas diffustion apparatus having incorporated therein an assembly including a non-self-supporting thin gas-permeable otherwise impervious metal foil and an openings-provided base of metal compatibly sintered to the metal of the foil and providing support therefor, said sintering being effected by pressing the foil against the base, elevating the temperature of the foil and base to a degree sufficient to permit sintering of the metal of the base to the foil but without melting of the foil or the base and without closing off the openings in the base, and maintaining the foil and base at such elevated temperature within an inert medium.

2. Apparatus as claimed in claim 1 and in which the thickness of the openings-provided base is greater than that of the foil.

3. Apparatus as claimed in claim 1 and in which the base comprises a relatively rigid wire gauze.

4. Apparatus as claimed in claim 1 and in which the base comprises a porous sintered bed.

5. Apparatus as claimed in claim 1 and in which a second similar foil is placed on the opposite side of the base from the first-named foil prior to the said pressing, temperature-elevating and sintering.

6. Apparatus as claimed in claim 1, wherein said foil is coated with a paste comprising the metal or a compound of the metal of the foil and baked to fill any unintentional holes in the foil.

7. Apparatus as claimed in claim 1 and in which a second thin gas-permeable otherwise impervious metal foil is placed upon the first-named foil prior to the said pressing, temperature-elevating, and sintering, the first-named foil being selected from the group consisting of nickel, palladium and silver-palladium and the said second foil being selected from the group consisting of silver-palladium and palladium.

References Cited

UNITED STATES PATENTS

| 2,824,620 | 2/1958 | DeRosset | 55—16 |
| 2,958,391 | 11/1960 | DeRosset | 55—158 X |
| 3,238,704 | 3/1966 | Straschil et al. | 55—158 |
| 3,241,298 | 3/1966 | Pierce | 55—158 X |
| 2,457,051 | 12/1948 | Le Clair | 29—163.5 |
| 3,073,697 | 1/1963 | Friese et al. | |
| 3,365,785 | 1/1968 | Valyi | 29—420.5 |

FOREIGN PATENTS

| 883,760 | 12/1961 | Great Britain. |
| 969,673 | 4/1964 | Great Britain. |

REUBEN FRIEDMAN, *Primary Examiner.*

JOHN ADEE, *Assistant Examiner.*